US012145327B2

(12) United States Patent
Sato et al.

(10) Patent No.: US 12,145,327 B2
(45) Date of Patent: Nov. 19, 2024

(54) FIBER PLACEMENT DEVICE

(71) Applicant: Toray Industries, Inc., Tokyo (JP)

(72) Inventors: Yasuhiro Sato, Otsu (JP); Tamotsu Suzuki, Otsu (JP); Kentaro Nagasaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 314 days.

(21) Appl. No.: 17/598,039

(22) PCT Filed: Mar. 26, 2020

(86) PCT No.: PCT/JP2020/013796
§ 371 (c)(1),
(2) Date: Sep. 24, 2021

(87) PCT Pub. No.: WO2020/203686
PCT Pub. Date: Oct. 8, 2020

(65) Prior Publication Data
US 2022/0176652 A1    Jun. 9, 2022

(30) Foreign Application Priority Data

Mar. 29, 2019  (JP) ................................ 2019-066795

(51) Int. Cl.
| | | |
|---|---|---|
| B29C 70/38 | (2006.01) | |
| B29C 70/54 | (2006.01) | |
| B32B 38/00 | (2006.01) | |

(52) U.S. Cl.
CPC .......... *B29C 70/384* (2013.01); *B29C 70/545* (2013.01); *B32B 38/0004* (2013.01)

(58) Field of Classification Search
CPC ..... B29C 70/384; B29C 70/545; B29C 70/38; Y10T 156/12; B32B 38/0004
See application file for complete search history.

(56) References Cited

U.S. PATENT DOCUMENTS

| | | | | |
|---|---|---|---|---|
| 4,178,739 A | * | 12/1979 | Du Broff | ................ B65B 13/04 |
| | | | | 53/210 |
| 4,897,148 A | * | 1/1990 | Orlandi | .................. H05K 3/288 |
| | | | | 156/759 |

(Continued)

FOREIGN PATENT DOCUMENTS

| | | |
|---|---|---|
| CN | 105690809 A | 6/2016 |
| JP | 2003-335443 A | 11/2003 |

(Continued)

OTHER PUBLICATIONS

Extended European Search Report dated Nov. 25, 2022, of counterpart European Patent Application No. 20784101.6.

*Primary Examiner* — Michael A Tolin
*Assistant Examiner* — Christopher C Caillouet
(74) *Attorney, Agent, or Firm* — DLA Piper LLP (US)

(57) ABSTRACT

A fiber placement device includes an accumulation portion that stores and discharges a reinforcing fiber bundle including: a movable roller guided by a guide mechanism able to be moved in a constant movable range; a cylinder; a piston arranged within the cylinder; a coupling member coupling the movable roller and the piston; and an adjustment portion adjusting a force applied to the piston within the cylinder by discharging fluid from a space with the cylinder sealed on a side opposite the coupling member with respect to the piston within the cylinder or supplying the fluid into the space, the fluid is discharged from the space within the cylinder to apply a force to the piston to move the piston, a force is also applied to the movable roller through the coupling member to move the movable roller and thus a tension is applied to the reinforcing fiber bundle.

8 Claims, 2 Drawing Sheets

(56) References Cited

U.S. PATENT DOCUMENTS

2017/0101286 A1\* 4/2017 Brockman ............ B65H 59/06
2017/0291377 A1 10/2017 Tsuji et al.
2020/0047435 A1 2/2020 James et al.

FOREIGN PATENT DOCUMENTS

| JP | 2013-139327 A | 7/2013 |
| JP | 2016-74490 A | 5/2016 |
| WO | 2016/047141 A1 | 3/2016 |
| WO | 2018/197719 A1 | 11/2018 |

\* cited by examiner

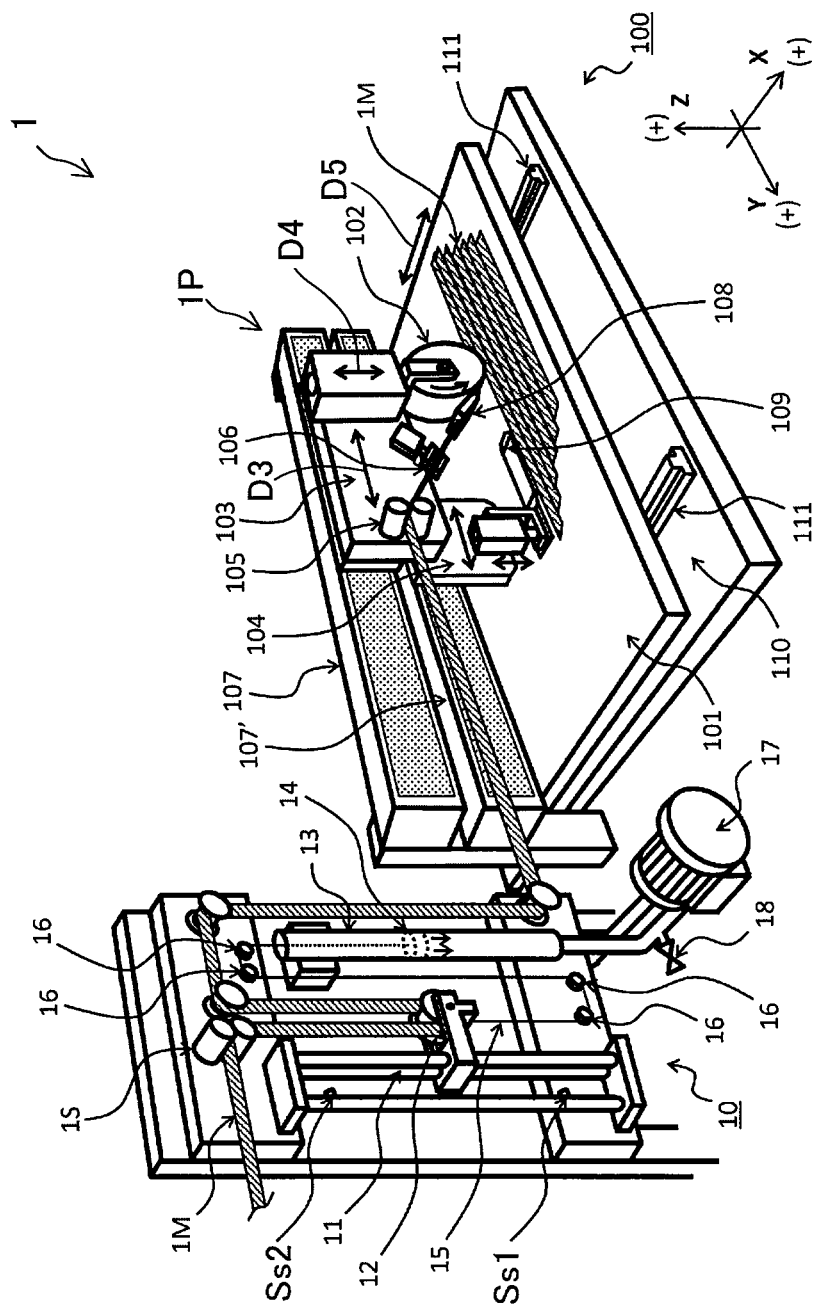

FIBER PLACEMENT DEVICE

TECHNICAL FIELD

This disclosure relates to fiber placement devices that are used to manufacture reinforced fiber plastics.

BACKGROUND

A three-dimensional preform is used to manufacture a reinforced fiber plastic. The three-dimensional preform is configured of a reinforced fiber such as a glass fiber or a carbon fiber. There is a known method of manufacturing the three-dimensional preform. A cut pattern having a desired shape is first cut out from a planar woven fabric base material configured of a reinforced fiber and having a constant width. The cut pattern is pressed, and thus a preform having a three-dimensional shape is formed. However, in that method, the remaining part of the woven fabric base material after the cut pattern is cut out is discarded. Hence, that method has a problem in which yield is poor and the manufacturing cost thereof is increased.

As one method of solving this problem, a fiber placement method is known. In the fiber placement method, reinforcing fiber bundles are previously placed only in a specific area on a table and adhered to each other to have a desired two-dimensional shape corresponding to the shape of the cut pattern described above. Consequently, it is not necessary to cut out the cut pattern, and thus it is possible to reduce the amount of reinforced fabric that is discharged.

WO 2016/047141 discloses a fiber placement device that uses that method to be able to place reinforcing fiber bundles on a table at high speed. That device comprises: a fiber bundle pressing portion that is able to press the reinforcing fiber bundles on the table; a fiber bundle supply mechanism that is able to supply the reinforcing fiber bundles to the table; and a cutting blade that is located independently of the fiber bundle supply mechanism and that uses the fiber bundle pressing portion to press the reinforcing fiber bundles to a blade edge to be able to cut the reinforcing fiber bundles. With that device, it is possible to place the reinforcing fiber bundles only in a predetermined area such that the reinforcing fiber bundles have a desired two-dimensional shape. Hence, it is possible to expect the improvement of the yield of the reinforcing fiber bundles. Furthermore, with that device, it is possible to cut the reinforcing fiber bundles without reducing the speed of travel of the fiber bundle supply mechanism. Hence, it is possible to expect an increase in the speed of the placement of the reinforcing fiber bundles.

In general, a reinforcing fiber bundle is wound on a bobbin. When the reinforcing fiber bundle is used, the reinforcing fiber bundle is drawn from the bobbin and supplied to a table with a fiber bundle supply mechanism. To realize an increase in the speed of placement of the reinforcing fiber bundle, the fiber bundle supply mechanism preferably draws the reinforcing fiber bundle with a stable tension and at high speed. In particular, the device of WO 2016/047141 described above repeats a series of operations of (1) the drawing of the reinforcing fiber bundle, (2) the placement of the reinforcing fiber bundle on the table and the cutting thereof and (3) the movement of the table on which the reinforcing fiber bundle is placed. Hence, the reinforcing fiber bundle is intermittently drawn into the fiber bundle supply mechanism. When the reinforcing fiber bundle is intermittently drawn from the bobbin, the tension of the reinforcing fiber bundle is not able to be kept constant due to the inertial force of the bobbin. In particular, when the reinforcing fiber bundle is drawn at high speed, the fiber bundle supply mechanism is not able to stably draw the reinforcing fiber bundle. Hence, to stably draw the reinforcing fiber bundle into the fiber bundle supply mechanism with a constant tension, it is preferable to continuously draw the reinforcing fiber bundle from the bobbin at a constant speed.

As a mechanism that makes it possible to continuously draw, in an upstream part, a travel base material such as a reinforcing fiber bundle from a bobbin at a constant speed and to intermittently place the reinforcing fiber bundle on a table in a downstream part, an accumulation mechanism is known. The accumulation mechanism is configured to be able to temporarily store the travel base material whose length is equal to or less than a constant value and discharge a necessary amount of travel base material to a downstream side with necessary timing. The accumulation mechanism is comprised between the bobbin a section where the travel base material necessary is processed intermittently, and thus it is possible to continuously supply the travel base material from the bobbin in the upstream part with respect to the accumulation mechanism and intermittently process the travel base material in the downstream part.

The accumulation device of Japanese Unexamined Patent Application Publication No. 2016-74490 comprises a roller on which a travel base material is supported and a pair of base portions which respectively support both end portions of the roller. In the accumulation device described above, the roller is moved together with the base portions to change the length of the path of the travel base material, and thus it is possible to temporarily store the travel base material and discharge the travel base material. The roller in this device is provided slidably with respect to the base portions and is configured to provide a tension to the travel base material. Hence, it is possible to stably control the tension of the travel base material.

However, in the device of Japanese Unexamined Patent Application Publication No. 2016-74490, a large number of components configure the device, and thus the weight of the entire device is inevitably increased. Hence, when the accumulation device of Japanese Unexamined Patent Application Publication No. 2016-74490 starts to discharge the travel base material stored, if the speed of discharge of the travel base material is increased for a short period of time, an excessive tension is applied to the travel base material due to the inertial force of the components which configure the device such as the base portions and the roller. When the discharge of the travel base material that is performed at high speed is suddenly stopped, the tension of the travel base material is significantly lowered due to the inertial force of the components which configure the device such as the base portions and the roller. Hence, the accumulation device of Japanese Unexamined Patent Application Publication No. 2016-74490 is not suitable for a fiber placement device that discharges a travel base material at high speed.

As one method of solving the problem caused by the inertial force of the members of the device described above, a method of using suction power of air without using a roller as in the device of Japanese Unexamined Patent Application Publication No. 2003-335443 is known. That device comprises a case having an opening portion and an air suction mechanism provided in a bottom surface portion of the case. In the device described above, a base material travelling around the opening portion of the case is drawn into the case and is stored within the case in a state where the base material is curved. In the device described above, members having inertia for changing the length of the path of the travel base material are not used. Hence, even when the travel base material is discharged at high speed, an excessive tension is not applied to the travel base material.

However, when in the device described above, the suction of the travel base material with the air suction mechanism is continued, the travel base material makes contact with the case to rub against the case. Hence, the travel base material may be scratched. Furthermore, when the travel base material is breathable, sucked air passes through the travel base material, and thus it is impossible to draw the travel base material into the case with a sufficient force. Consequently, a tension applied to the travel base material is unstable.

To solve the problem described above, Japanese Unexamined Patent Application Publication No. 2013-139327 discloses a device in which an air ejection portion for preventing a travel base material from making contact with a case is provided. However, when the travel base material is breathable as with a reinforcing fiber bundle, it is still impossible to expect sufficient drawing of the travel base material and application of a stable tension.

It could therefore be helpful to provide a fiber placement device comprising an accumulation portion that is able to supply a reinforcing fiber bundle at high speed while applying a stable tension to the reinforcing fiber bundle.

SUMMARY

We thus provide:
(1) In a fiber placement device comprising an accumulation portion capable of storing and discharging a reinforcing fiber bundle, the accumulation portion comprises: a movable roller on which the reinforcing fiber bundle is wound and which is guided by a guide mechanism to be able to reciprocate in a constant movable range; a hollow cylinder; a piston provided within the cylinder and guided to the inner surface of the cylinder to be able to reciprocate in a constant movable range; and a coupling member which couples the movable roller and the piston, the internal region of the cylinder is decompressed or pressurized and thus a force is applied to the piston to move the piston and the same force is applied to the movable roller through the coupling member and thus the movable roller is moved to apply a tension to the reinforcing fiber bundle.
(2) In the fiber placement device described in (1), the distance of a gap between the inner surface of the cylinder and the outer surface of the piston is 0.001 to 5 mm.
(3) In the fiber placement device described in (1) or (2), at least part of the coupling member which couples the movable roller and the piston is a flexible linear member.
(4) The fiber placement device described in (3) comprises a tension detection mechanism which detects the tension of the linear member.
(5) In the fiber placement device described in (4), the pressure of the internal region of the cylinder is controlled according to the tension of the linear member detected with the tension detection mechanism.
(6) The fiber placement device described in any one of (1) to (5) comprises a stored amount detection mechanism which detects a stored amount of the reinforcing fiber bundle.
(7) The fiber placement device described in (6), the feed speed of the reinforcing fiber bundle is able to be adjusted according to the stored amount of the reinforcing fiber bundle detected with the stored amount detection mechanism.
(8) In the fiber placement device described in any one of (1) to (7), the accumulation portion comprises a suction blower decompressing the internal region of the cylinder and a valve capable of taking outside air into the cylinder.
(9) The fiber placement device may comprise: a table; a supply mechanism drawing a reinforcing fiber bundle wound on a bobbin to supply the reinforcing fiber bundle to the outside; a placement mechanism having the reinforcing fiber bundle supplied to be able to place the reinforcing fiber bundle in an arbitrary area on the table; a cutting blade cutting the reinforcing fiber bundle supplied from the placement mechanism toward the table; and an accumulation portion arranged on the path of the reinforcing fiber bundle delivered from the supply mechanism toward the placement mechanism. The accumulation portion comprises a movable roller that guides the reinforcing fiber bundle delivered from the supply mechanism toward the placement mechanism and that is movably provided, a cylinder, a piston arranged within the cylinder, a coupling member which couples the movable roller and the piston and an adjustment portion adjusting a force applied to the piston by discharging a fluid from a space on a side opposite to the coupling member with respect to the piston within the cylinder.

Thus, a force applied to the movable roller is adjusted by the force applied to the piston. Hence, compared to a device in which the position of the movable roller is changed by a link mechanism, even when the transport speed of the reinforcing fiber bundle is rapidly changed, it is possible to reduce a change in a tension applied to the reinforcing fiber bundle. Therefore, it is possible to draw the reinforcing fiber bundle at high speed while applying a stable tension.
(10) In the fiber placement device described above, the distance of a gap between the inner surface of the cylinder and the outer surface of the piston may be 0.001 to 5 mm.
(11) In the fiber placement device described above, even when the supply mechanism and the placement mechanism are operated on the movable roller, at least part of the coupling member may be a flexible linear member, and the cylinder, the piston and the coupling member may be configured to be able to pull, in the movable range of the movable roller, the movable roller against the tension of the reinforcing fiber bundle guided by the movable roller.

The device as described above is adopted, and thus it is possible to reduce the inertia of the mechanism for changing the position of the movable roller compared to a device in which the coupling member is configured not with the linear member but with a rigid member.
(12) In the fiber placement device described above, a tension detection portion may be comprised that detects the tension of the linear member.
(13) In the fiber placement device described above, the adjustment portion may control the pressure of the space within the cylinder according to the output of the tension detection portion.

The device as described above is adopted, and thus it is possible to control the tension of the reinforcing fiber bundle based on the tension of the linear member without directly measuring the tension of the reinforcing fiber bundle.
(14) In the fiber placement device described above, a stored amount detection portion may be comprised that detects the stored amount of the reinforcing fiber bundle based on the position of the movable roller.
(15) In the fiber placement device described above, the supply mechanism may adjust the supply speed of the reinforcing fiber bundle according to the stored amount of the reinforcing fiber bundle detected with the stored amount detection portion.

The device as described above is adopted, and thus it is possible to increase the possibility that the fiber placement device is operated without using up the ability of the accumulation portion to absorb changes in the difference between the amount of supply of the reinforcing fiber bundle by the supply mechanism and the amount of processing on the reinforcing fiber bundle by the placement mechanism.

(16) In the fiber placement device described above, the accumulation portion may comprise a blower connected to the space within the cylinder to discharge air in the space within the cylinder to the outside and a valve controlling the flow rate of gas in a flow path connecting the space within the cylinder and the outside.

This disclosure is also able to be realized by various configurations other than a fiber placement device. For example, this disclosure is able to be realized by configurations such as a reinforced fiber sheet manufacturing device, an accumulation mechanism and a controlling method thereof, a computer program for realizing the controlling method and a non-transitory recording medium which records the computer program.

With the fiber placement device, it is possible to draw a reinforcing fiber bundle at high speed while applying a stable tension to the reinforcing fiber bundle and to consequently place the reinforcing fiber bundle on a table at high speed.

BRIEF DESCRIPTION OF THE DRAWINGS

FIG. 2 is a perspective view of the fiber placement device according to the example.

REFERENCE SIGNS LIST

Figure 1:
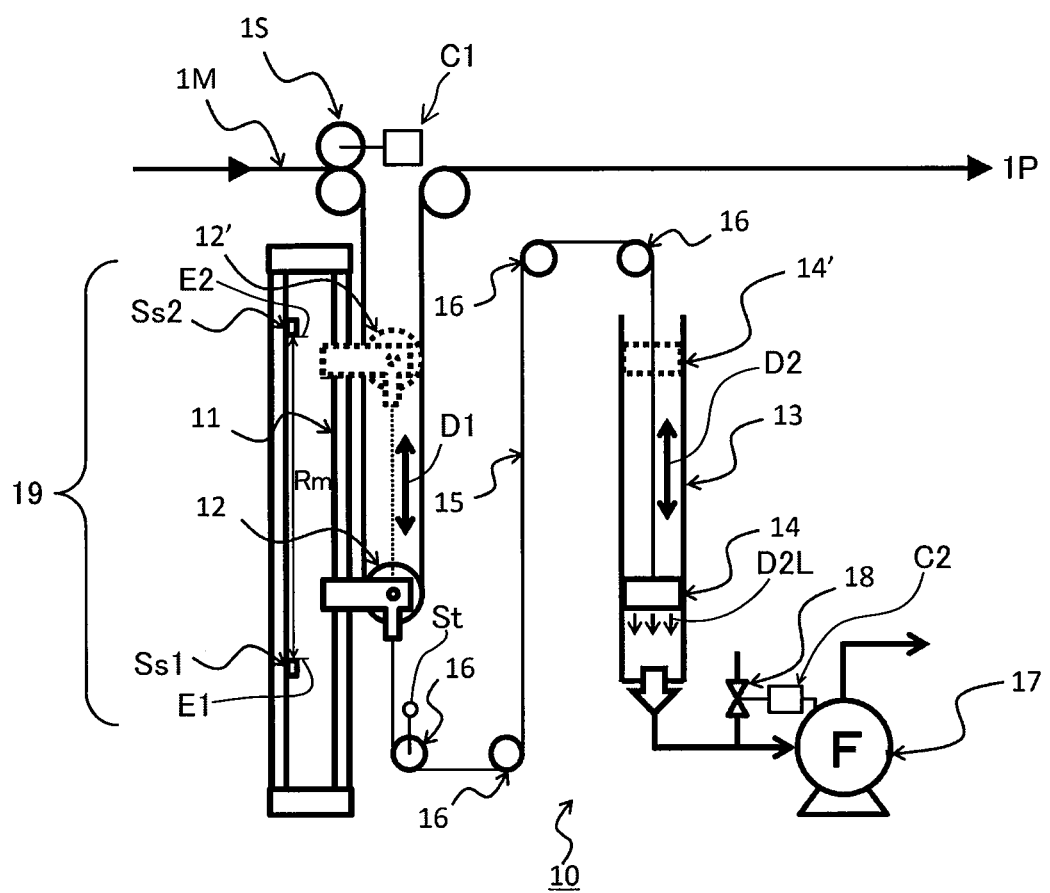
FIG. 1 is a schematic view illustrating operation of the accumulation portion 10 of a fiber placement device according to an example.

1: fiber placement device, 1M: reinforcing fiber bundle, 1P: placement mechanism, 1S: supply mechanism, 10: accumulation portion, 11: guide mechanism, 12: movable roller, 12': movable roller in another position, 13: cylinder, 14: piston, 14': piston in another position, 15: coupling member, 16: guide roller, 17: suction blower, 18: valve, 19: stored amount detection portion, 100: fiber placement portion, 101: table, 102: fiber bundle pressing mechanism, 103: fiber bundle supply mechanism, 104: fiber bundle cutting mechanism, 105: nip roller, 106: nip mechanism, 107: slider mechanism, 107': slider mechanism, 108: final guide, 109: cutting blade, 110: table base, 111: guide rail, C1: first control portion, C2: second control portion, D1: arrows indicating direction of movement of movable roller, D2: arrows indicating direction of movement of piston, D2L: arrows indicating direction of movement of piston, D3: arrows indicating direction of movement of placement mechanism, D4: arrows indicating direction of movement of fiber bundle pressing mechanism, D5: arrows indicating direction of movement of table, E1: lower limit of movable range of movable roller 12, E2: upper limit of movable range of movable roller 12, Rm: movable range of movable roller 12, Ss1: excess sensor, Ss2: shortage sensor, St: tension detection portion.

DETAILED DESCRIPTION

Specific examples of our devices will be described below with reference to the drawings. The following description is intended to facilitate the understanding of the examples and is not intended to limit this disclosure at all. For ease of understanding of those skilled in the art, the description of preferable forms and variations in each of the examples may be simultaneously interpreted as the description of the fiber placement device serving as high-level concepts. For convenience, an upward direction and a downward direction in the drawings are assumed to be an "upward direction" and a "downward direction". However, the upward direction in the drawings does not necessarily mean a vertically upward direction, and the downward direction in the drawings does not necessarily mean a vertically downward direction.

A. Example

A1. Supply Mechanism and Accumulation Portion (1) Hardware configurations of supply mechanism and accumulation portion:

FIG. 1 is a schematic view illustrating operation of an accumulation portion 10 comprised in a fiber placement device 1 according to an example. FIG. 1 shows a supply mechanism 1S and the accumulation portion 10 in the fiber placement device 1.

The supply mechanism 1S draws a reinforcing fiber bundle 1M wound on a bobbin and supplies it to the outside as shown in an upper left part of FIG. 1. The reinforcing fiber bundle 1M is finally supplied to a fiber bundle pressing mechanism 102 in a placement mechanism 1P and is placed in an arbitrary area on a table 101 as shown in an upper right part of FIG. 1. The placement mechanism 1P and the fiber bundle pressing mechanism 102 will be described later.

The accumulation portion 10 is arranged on the path of the reinforcing fiber bundle 1M delivered from the supply mechanism 1S toward the placement mechanism 1P as shown in a lower section of FIG. 1. The accumulation portion 10 comprises a guide mechanism 11, a movable roller 12, a cylinder 13, a piston 14, a coupling member 15, a plurality of guide rollers 16, a suction blower 17 and a valve 18.

The movable roller 12 is one of a plurality of rollers that guide the reinforcing fiber bundle 1M delivered from the supply mechanism 1S toward the placement mechanism 1P as shown in a middle left part of FIG. 1. The movable roller 12 is movably provided along a direction D1 that is previously determined. In FIG. 1, both ends of the movable range of the movable roller 12 are represented by reference signs E1 and E2.

The movable roller 12 is configured such that, for example, when the placement mechanism 1P arranges the reinforcing fiber bundle 1M on the table 101 at the highest speed, the movable roller 12 is moved by the tension of the reinforcing fiber bundle 1M toward the one end E2 in a range Rm. The range Rm is a range of the movable range of the movable roller 12 which does not include both the ends E1 and E2.

The guide mechanism 11 guides the movable roller 12. The movable roller 12 slides along the guide mechanism 11.

The piston 14 and the cylinder 13 are a mechanism that adjusts a force applied to the movable roller 12. The piston 14 is arranged within the cylinder 13. In this example, the distance of a gap between the inner surface of the cylinder 13 and the outer surface of the piston 14 is 0.01 mm.

The coupling member 15 couples the movable roller 12 and the piston 14. The coupling member 15 is a flexible linear member. Specifically, the coupling member 15 is a wire that is configured by twisting metal wires.

The form as described above is adopted, and thus it is possible to reduce the inertia of the mechanism to change the position of the movable roller 12 compared to a form in which the coupling member 15 is not configured with the linear member but with a rigid member.

The coupling member 15 is not able to transmit a pressing force produced by the piston 14 to the movable roller 12. On the other hand, the coupling member 15 is able to transmit a pulling force produced by the piston 14 to the movable roller 12. More specifically, the cylinder 13, the piston 14 and the coupling member 15 are configured to be able to pull, in the range Rm which does not include both the ends E1 and E2, the movable roller 12 toward the end E1 against the tension of the reinforcing fiber bundle 1M guided by the movable roller 12. In other words, even when the supply mechanism 1S and the placement mechanism 1P are operated and a tension is applied to the reinforcing fiber bundle 1M, the cylinder 13, the piston 14 and the coupling member 15 are able to pull the movable roller 12 in a direction opposite to a direction in which the movable roller 12 is pulled by the reinforcing fiber bundle 1M.

The plurality of guide rollers 16 guide the coupling member 15 extending from the piston 14 to the movable roller 12.

The suction blower 17 is connected to a space on a side opposite to the coupling member 15 with respect to the piston 14 within the cylinder 13. The suction blower 17 is able to discharge air in the space within the cylinder 13 to the outside. The valve 18 is able to control the flow rate of air in a flow path that connects the space within the cylinder 13 and the outside. The degree of opening of the valve 18 is adjusted, and thus the degree of suction of the air in the space within the cylinder 13 by the suction blower 17 is adjusted. Consequently, a force that is applied to the piston 14 due to the pressure of the space within the cylinder 13 is adjusted.

(2) Sensors and control portions in supply mechanism and accumulation portion:

The supply mechanism 1S comprises a first control portion C1 that controls the individual parts of the first control portion C1. The accumulation portion 10 comprises a second control portion C2 that controls the individual parts of the accumulation portion 10. The accumulation portion 10 comprises a stored amount detection portion 19 and a tension detection portion St.

The stored amount detection portion 19 detects the stored amount of reinforcing fiber bundle 1M based on the position of the movable roller 12. More specifically, the stored amount detection portion 19 comprises an excess sensor Ss1 and a shortage sensor Ss2. The excess sensor Ss1 detects that the movable roller 12 is located at the one end E1 in the movable range of the movable roller 12. The fact that the movable roller 12 reaches the one end E1 means that the stored amount of reinforcing fiber bundle 1M in the accumulation portion 10 is excessive. The shortage sensor Ss2 detects that the movable roller 12 is located at the other end E2 in the movable range of the movable roller 12. The fact that the movable roller 12 reaches the other end E2 means that the stored amount of reinforcing fiber bundle 1M in the accumulation portion 10 is insufficient.

The first control portion C1 of the supply mechanism 1S adjusts the supply speed of the reinforcing fiber bundle 1M in the supply mechanism 1S. More specifically, the first control portion C1 adjusts the supply speed of the reinforcing fiber bundle 1M according to the stored amount of reinforcing fiber bundle 1M detected with the stored amount detection portion 19. In other words, when the shortage sensor Ss2 detects that the movable roller 12 reaches the end E2, the first control portion C1 increases the supply speed of the reinforcing fiber bundle 1M. Thereafter, when the movable roller 12 is not moved away from the one end E2, the first control portion C1 further increases the supply of the reinforcing fiber bundle 1M. On the other hand, when the excess sensor Ss1 detects that the movable roller 12 reaches the one end E1, the first control portion C1 lowers the supply speed of the reinforcing fiber bundle 1M. Thereafter, when the movable roller 12 is not moved away from the one end E1, the first control portion C1 stops the supply of the reinforcing fiber bundle 1M.

The processing as described above is performed, and thus it is possible to increase the possibility that the fiber placement device 1 is operated without using up the ability of the accumulation portion 10 to absorb changes in the difference between the amount of supply of the reinforcing fiber bundle 1M by the supply mechanism 1S and the amount of processing on the reinforcing fiber bundle 1M by the placement mechanism 1P.

The tension detection portion St detects the tension of the coupling member 15 which is the linear member. Specifically, the tension detection portion St detects a force received from the coupling member 15 which is the linear member by the guide roller 16 closest to the movable roller 12 on the path of the coupling member 15 among the plurality of guide rollers 16, and detects the tension of the coupling member 15 based on the detection value thereof The second control portion C2 controls the suction blower 17 and the valve 18. More specifically, the second control portion C2 controls the pressure of the space within the cylinder 13 according to the output of the tension detection portion St. When the tension of the coupling member 15 is greater than a predetermined range, the degree of opening of the valve 18 is increased, and thus the pressure of the space within the cylinder 13 is temporarily increased. Then, the pressure of the space within the cylinder 13 is increased, and thus the tension of the coupling member 15 is lowered. Consequently, the tension of the reinforcing fiber bundle 1M is also lowered. When the tension of the coupling member 15 is lower than the predetermined range, the degree of opening of the valve 18 is reduced, and thus the pressure of the space within the cylinder 13 is lowered. Then, the tension of the coupling member 15 is increased. Consequently, the tension of the reinforcing fiber bundle 1M is also increased.

The processing as described above is performed, and thus it is possible to control the tension of the reinforcing fiber bundle 1M based on the tension of the linear member without directly measuring the tension of the reinforcing fiber bundle 1M.

The second control portion C2, the suction blower 17 and the valve 18 are also collectively referred to as an "adjustment portion". The adjustment portion adjusts a force applied to the piston 14 within the cylinder 13 by discharging a fluid from the space on the side opposite to the coupling member 15 with respect to the piston 14 within the cylinder 13.

(3) Operations of supply mechanism and accumulation portion:

As described above, the movable roller 12 is comprised in the accumulation portion 10. The reinforcing fiber bundle 1M supplied by the supply mechanism 1S is wound on the movable roller 12. The movable roller 12 is guided by the guide mechanism 11 to slide vertically to be able to linearly reciprocate in a constant movable range.

In this example, when the reinforcing fiber bundle 1M is stored, the movable roller 12 slides downward along the guide mechanism 11 whereas when the reinforcing fiber bundle 1M is discharged toward a downward part, the movable roller 12 slides upward. In FIG. 1, the movable roller 12 that has slid upward is represented by the reference sign of 12'.

The direction of the reciprocating movement of the movable roller is not limited at all. In other words, the movable roller may be configured to slide vertically or may be configured to slide horizontally. As the direction of movement of the movable roller, an optimal direction may be selected according to the restriction of the layout of the device and the like. The guide mechanism may also be configured as follows. Specifically, the guide mechanism is configured as an arm capable of being rotated on one end portion of the guide mechanism serving as a pivot point. The guide mechanism has the movable roller 12 at the other end portion. In the form described above, the movable roller 12 is able to curvedly reciprocate in the constant movable range by the rotational motion with the pivot point being the center thereof The movable range of the movable roller 12 is determined such that the longest reinforcing fiber bundle 1M placed in the fiber placement device 1 is able to be stored. The length of the guide mechanism 11 is determined based on the movable range of the movable roller 12. However, the movable range of the movable roller 12 and the length of the guide mechanism 11 are preferably set to be minimized in terms of the cost and the layout of the device.

When the reinforcing fiber bundle 1M is discharged from the accumulation portion 10 at high speed, the movable roller 12 preferably slides quickly. Hence, the movable roller 12 is preferably configured such that the influence of the inertial force of the movable roller 12 on the movement of the movable roller 12 is minimized. In other words, a structure including the movable roller 12 that includes members that make the guide mechanism 11 guide the movable roller 12 is preferably lightweight.

Specifically, it is preferable to select a lightweight resin as the material of the movable roller 12. Within a range allowed by the properties of the reinforcing fiber bundle 1M (such as the minimum radius of curvature), the outside diameter of the movable roller 12 is preferably 10 to 100 mm.

The accumulation portion 10 comprises the cylinder 13 and the piston 14. The piston 14 is set to be able to freely reciprocate within the cylinder 13. The internal space of the cylinder 13 is decompressed or pressurized, and thus a force is applied to the piston 14, with the result that the piston 14 within the cylinder 13 is moved in one direction or the other. As long as the piston 14 is able to be smoothly moved within the cylinder 13, the cross-sectional shape of the inner surface of the cylinder 13 is preferably substantially the same as the cross-sectional shape of the outer shape of the piston 14.

It is preferable to provide a gap between the inner surface of the cylinder 13 and the outer surface of the piston 14 to smoothly move the piston 14 within the cylinder 13. However, when the gap is excessively large, when the internal region of the cylinder 13 is decompressed or pressurized, air is excessively passed through this gap, with the result that it is impossible to apply a sufficient force to the piston 14. Hence, the gap between the inner surface of the cylinder 13 and the outer surface of the piston 14 is preferably moderately reduced in size, and specifically, the distance of the gap is preferably 0.001 to 5 mm. Furthermore, to stably move the piston 14 within the cylinder 13 without the piston 14 being greatly inclined, it is more preferable to set the distance of the gap at 0.001 to 1 mm.

The inner surface of the cylinder 13 needs to be smooth without a convex portion and the like such that the piston 14 is prevented from being caught when moved within the cylinder 13. Hence, as the cylinder 13, a honing pipe whose inner surface is processed with a high degree of precision to be finished like a mirror surface is preferably used.

To prevent the influence of inertia, it is preferable to select, as the material of the piston 14, a lightweight resin as in the movable roller 12.

In this example, the suction blower 17 that decompresses the internal space of the cylinder 13 is coupled to a lower part of the cylinder 13 through a pipe, a hose or the like, and the valve 18 capable of taking in outside air is further comprised in the pipe or the hose. When the suction blower 17 is operated, the interior of the space below the piston 14 within the cylinder 13 is decompressed, and thus a force acting downward is applied to the piston 14, with the result that the piston 14 is pulled downward. In other words, the piston 14 is decompressed to be moved downward as shown by an arrow D2L in FIG. 1.

In this example, the suction blower 17 is provided below the piston 14 within the cylinder 13. The lower side of the piston 14 within the cylinder 13 is decompressed, and thus a force is applied to the piston 14. However, the configuration of the cylinder and the piston is not limited to this configuration, and a force may be applied to the piston 14 by pressurizing the upper side of the piston 14 within the cylinder 13.

The movable roller 12 and the piston 14 are coupled together with the coupling member 15. Hence, when the internal region of the cylinder 13 is decompressed or pressurized and thus a force is applied to the piston 14 to move the piston 14, the movable roller 12 coupled by the coupling member 15 is also moved accordingly, with the result that a tension T is applied to the reinforcing fiber bundle 1M.

As long as the coupling member 15 is a member capable of directly transmitting a force generated by the pressurization or decompression to the movable roller 12, the coupling member 15 is not particularly limited. However, it is preferable to select a member formed of a non-stretchable material. Specifically, it is preferable to select, as the coupling member 15, a flexible linear member such as Kevlar or metal.

When the gap between the inner surface of the cylinder 13 and the outer surface of the piston 14 is sufficiently small, the tension T applied to the reinforcing fiber bundle 1M is able to be calculated by formula (1).

$$T = (P \times A)/2 \quad (1)$$

where T represents the tension applied to the reinforcing fiber bundle 1M, P represents the pressure of the internal region of the cylinder 13 and A represents the cross-sectional area of the inner surface of the cylinder 13.

Hence, for example, when the tension T applied to the reinforcing fiber bundle 1M is desired to be increased, it is preferable to increase the ability of the suction blower 17 or to increase the inner surface of the cylinder 13 and the cross-sectional area of the piston 14.

The valve 18 is gradually opened, and thus a decompressing force or a pressurizing force for the internal region of the cylinder 13 is lowered. In other words, the pressure within the cylinder 13 gradually approaches an outside pressure. Consequently, the degree of opening of the valve 18 is adjusted, and thus it is possible to adjust the tension T applied to the reinforcing fiber bundle 1M.

Furthermore, when the coupling member 15 is a flexible linear member, the tension detection portion St for detecting the tension of the linear member is provided, and thus it is possible to control the pressure of this internal space of the cylinder 13 according to the tension, for example, by performing feedback control on the suction blower 17 based on the detected tension, with the result that it is possible to further stabilize the tension T of the reinforcing fiber bundle.

In the accumulation portion 10, as described above, the stored amount detection portion 19 for detecting the stored amount of reinforcing fiber bundle 1M is comprised as shown in a left part of FIG. 1. The fiber placement device 1 has the two sensors Ss1 and Ss2 serving as the stored amount detection portion 19, and thus it is possible to detect the upper limit E2 and the lower limit E1 of the slide position of the movable roller 12. When the sensor Ss1 on the lower side detects the movable roller 12, the first control portion C1 of the supply mechanism 1S determines that the stored amount is excessive whereas when the sensor Ss2 on the upper side detects the movable roller 12, the first control portion C1 determines that the stored amount is insufficient. When the stored amount is excessive, the first control portion C1 decelerates or stops the supply of the reinforcing fiber bundle 1M in the supply mechanism 1S. When the stored amount is insufficient, the first control portion C1 accelerates the supply of the reinforcing fiber bundle 1M in the supply mechanism 1S. As described above, with the stored amount detection portion 19, the feed speed of the reinforcing fiber bundle 1M in the supply mechanism 1S is controlled, and thus even when the reinforcing fiber bundle 1M is discharged at high speed, the storage and the discharge are able to be performed stably.

The accumulation portion 10 as described above is comprised, and thus it is possible to repeat the storage and the discharge while stably applying the tension to the reinforcing fiber bundle 1M and to draw the reinforcing fiber bundle 1M into a fiber placement portion 100 on the downstream side even at high speed.

A2. Fiber Placement Device

FIG. 2 is a perspective view showing the entire fiber placement device 1 comprising the accumulation portion 10 described above and the fiber placement portion 100 that places the reinforcing fiber bundle 1M drawn from the accumulation portion 10 on the table 101. The configuration of the fiber placement portion 100 shown in FIG. 2 is an example, and the configuration of the fiber placement portion is not limited at all.

In this example, the fiber placement portion 100 comprises the following configuration in addition to the supply mechanism 1S and the accumulation portion 10 shown in FIG. 1. Specifically, the fiber placement portion 100 comprises the fiber bundle pressing mechanism 102 that is able to press the reinforcing fiber bundle 1M to the table 101, a fiber bundle supply mechanism 103 that is able to supply the reinforcing fiber bundle 1M to the table 101, a fiber bundle cutting mechanism 104 that is located independently of the fiber bundle supply mechanism 103 and that uses the fiber bundle pressing mechanism 102 to press a cutting blade to the reinforcing fiber bundle 1M to be able to cut the reinforcing fiber bundle 1M, a nip roller 105, a nip mechanism 106, slider mechanisms 107 and 107', a final guide 108, the cutting blade 109, a table base 110 and a guide rail 111.

The reinforcing fiber bundle 1M is passed through the nip roller 105 and is grasped by the nip mechanism 106. The fiber bundle supply mechanism 103 travels in the negative direction of a Y axis by the slider mechanism 107, and thus the reinforcing fiber bundle 1M is drawn to a desired position as shown by arrows D3 in FIG. 2. By this operation of the fiber bundle supply mechanism 103 described above, the reinforcing fiber bundle 1M is drawn to be discharged from the accumulation portion 10. The fiber bundle pressing mechanism 102 is able to be arranged in two positions in the direction of a Z axis as shown by arrows D4 in FIG. 2. While the fiber bundle supply mechanism 103 is travelling in the negative direction of the Y axis, the fiber bundle pressing mechanism 102 rises in the positive direction of the Z axis. Then, the grasping of the reinforcing fiber bundle 1M by the nip mechanism 106 is released, the fiber bundle pressing mechanism 102 is lowered in the negative direction of the Z axis and thus the reinforcing fiber bundle 1M is pressed to the table 101. Thereafter, the fiber bundle supply mechanism 103 travels in the positive direction of the Y axis by the slider mechanism 107, and thus the reinforcing fiber bundle 1M is placed on the table 101. The accuracy of the position of the reinforcing fiber bundle 1M in the direction of an X axis is maintained and the meandering thereof is suppressed by the final guide 108.

At the same time as described above, by a separate slider mechanism 107' different from the slider mechanism 107, the fiber bundle cutting mechanism 104 that is able to be moved to a desired position in the direction of the Y axis waits in advance at a destination to which the fiber bundle supply mechanism 103 travels. In other words, the cutting blade 109 comprised in the fiber bundle cutting mechanism 104 is on standby on the table 101. When in this state, the fiber bundle supply mechanism 103 approaches the fiber bundle cutting mechanism 104 waiting in advance, the reinforcing fiber bundle 1M is brought into contact with the blade edge of the cutting blade 109, and the reinforcing fiber bundle 1M is further pressed by the fiber bundle pressing mechanism 102 to the blade edge of the cutting blade 109, with the result that the reinforcing fiber bundle 1M is cut.

The fiber bundle pressing mechanism 102, the fiber bundle supply mechanism 103, the nip roller 105, the nip mechanisms 106, the slider mechanisms 107 and 107', the final guide 108 and the cutting blade 109 are also collectively referred to as the "placement mechanism 1P". The reinforcing fiber bundle 1M supplied from the accumulation portion 10 to the placement mechanism 1P is placed in an arbitrary area on the table 101 by the placement mechanism 1P. The reinforcing fiber bundle 1M supplied from the placement mechanism 1P toward the table 101 is cut with the cutting blade 109.

The fiber bundle pressing mechanism 102 is brought into contact with the cutting blade 109 comprised in the fiber bundle cutting mechanism 104, then the reinforcing fiber bundle 1M is only passed over the blade edge while being pressed to the blade edge and thus the reinforcing fiber bundle 1M is cut. Hence, the fiber bundle supply mechanism 103 that is travelling does not need to be decelerated for cutting of the reinforcing fiber bundle 1M. Therefore, the fiber placement portion 100 is able to make the most of the ability of the slider mechanisms 107 and 107', and thus it is possible to realize both the drawing of the reinforcing fiber bundle 1M at high speed and the placement thereof at high speed.

The table 101 is a table that is able to realize attraction power for holding the position of the reinforcing fiber bundle 1M that is placed and cut. Examples of the attraction power of the attraction function of the table 101 include suction power produced by air, electrostatic attraction power produced by static electricity, adhesive power produced by an adhesive material and the like. The table 101 is able to be moved in the positive or negative directions of the X axis by the guide rail 111 provided on the table base 110 as shown by arrows D5 in FIG. 2.

When a series of operations from the drawing, the placement and to the cutting of the reinforcing fiber bundle 1M are completed, the table 101 is moved only a preset distance in the positive or negative direction of the X axis. The direction of the movement may be set to the positive or the negative direction. The preset distance may be set equal to, for example, the width of the reinforcing fiber bundle 1M.

Thereafter, the fiber placement portion 100 repeats the operations described above until the completion of the placement of the reinforcing fiber bundle 1M in a desired outer perimeter shape, and thus the original form of a reinforced fabric sheet having a desired two-dimensional shape is formed.

In the fiber placement device 1 of this example, the movable roller 12 is moved, and thus the path of the reinforcing fiber bundle 1M is changed, with the result that it is possible to adjust the length of the reinforcing fiber bundle 1M stored within the accumulation portion 10 as shown in the left part of FIG. 1. Hence, the placement mechanism 1P located in the downstream part of the accumulation portion 10 is able to intermittently arrange the reinforcing fiber bundle 1M on the table 101. On the other hand, the supply mechanism 1S located in the upstream part of the accumulation portion 10 is able to draw the reinforcing fiber bundle 1M wound on the bobbin at a constant speed. Consequently, it is possible to reduce the influence of the moment of inertia of the bobbin on the tension of the reinforcing fiber bundle 1M.

Furthermore, in the fiber placement device 1 of this example, the force applied to the movable roller 12 is adjusted by the force applied to the piston 14 connected with the coupling member 15 which is the linear member as shown in a middle part of FIG. 1. Hence, compared to a form in which the position of the movable roller 12 is changed by a link mechanism, even when the transport speed of the reinforcing fiber bundle 1M is rapidly changed, it is possible to reduce a change in the tension applied to the reinforcing fiber bundle 1M. Therefore, it is possible to draw the reinforcing fiber bundle 1M at high speed and supply it to the placement mechanism 1P while applying a stable tension.

B. Other Examples

B1. Other Examples 1

(1) In the example described above, the fiber bundle supply mechanism 103 and the fiber bundle cutting mechanism 104 are able to be moved in the direction of the Y axis, and the table 101 is able to be moved in the direction of the X axis. However, the fiber placement device may be configured such that the placement mechanism is able to be moved in the direction of the Y axis. The fiber placement device may also be configured such that the table is able to be moved in the direction of the X axis and the direction of the Y axis.

(2) In the example described above, the suction blower 17 is able to discharge air in the space within the cylinder 13 to the outside. However, the blower may be configured to be able to supply air from the outside into the space within the cylinder 13.

(3) In the example described above, the second control portion C2, the suction blower 17 and the valve 18 serving as the "adjustment portion" have the function of discharging air from or supplying air into the space within the cylinder 13 obtained by defining a part with the piston 14 to move the piston 14 within the cylinder 13. However, the adjustment portion may have a form in which a gas other than air such as nitrogen or a liquid is discharged from or is supplied into the space within the cylinder 13 to move the piston 14 within the cylinder 13.

B2. Other Example 2

In the example described above, the distance of the gap between the inner surface of the cylinder 13 and the outer surface of the piston 14 is 0.01 mm to fall within a range of 0.001 to 5 mm. However, the distance of the gap between the inner surface of the cylinder 13 and the outer surface of the piston 14 may be 0.0001 mm, 5.5 mm or the like to fall outside the range of 0.001 to 5 mm.

B3. Other Examples 3

(1) In the example described above, the movable roller 12 is configured to be moved toward the one end E2 when the placement mechanism 1P arranges the reinforcing fiber bundle 1M on the table 101 at the maximum speed as shown in the left part of FIG. 1. The movable roller 12 may be moved toward the one end E2 even when the placement mechanism 1P arranges the reinforcing fiber bundle 1M on the table 101 at a speed less than the maximum speed.

The movable roller may be configured to be moved toward the other end E1 by, for example, gravity applied to the movable roller 12 when the supply mechanism 1S and the placement mechanism 1P are operated. However, the cylinder, the piston and the coupling member are preferably configured to be able to pull the movable roller in a direction opposite to the direction of movement of the movable roller when a force is not received from the coupling member.

(2) In the description of the example mentioned above, the movable roller 12 is configured to be moved toward the one end E2 under predetermined conditions in the range Rm of the movable range of the movable roller 12 which does not include both the ends E1 and E2. However, the movable roller 12 may be configured to be moved toward one end under predetermined conditions in a range including one of both the ends E1 and E2 or the other.

(3) In the description of the example mentioned above, the cylinder 13, the piston 14 and the coupling member 15 are configured to be able to pull the movable roller 12 in the range Rm which does not include both the ends E1 and E2 against the tension of the reinforcing fiber bundle 1M guided by the roller 12 toward the end E1. However, the cylinder 13, the piston 14 and the coupling member 15 may be configured to be able to pull the movable roller 12 in a range including one of both ends of the movable range of the movable roller or the other toward the end.

(4) In the example described above, the coupling member 15 is the flexible linear member. However, part of the coupling member may be a structure that has a rigidity greater than the linear member. In such a structure, at least part of the coupling member is preferably a flexible linear member.

B4. Other Examples 4

(1) In the example described above, the tension detection portion St detects a force received from the coupling member 15 which is the linear member by the guide roller 16 closest to the movable roller 12 on the path of the coupling member 15 among the guide rollers 16, and detects the tension of the coupling member 15 based on the detection value thereof. However, the tension detection portion may be provided in a guide roller other than the guide roller 16 closest to the movable roller 12 on the path of the coupling member 15 among the guide rollers 16. The tension detection portion may be provided in a structure that has a configuration other than the guide roller and that receives a force from the coupling member which is the linear member.

(2) In the example described above, the accumulation portion 10 comprises the tension detection portion St that detects the tension of the coupling member 15 which is the linear member as shown in a lower middle part of FIG. 1. However, the accumulation portion may have a form in which the tension detection portion is not comprised. Even in such a form, the placement mechanism 1P located in the downstream part of the accumulation portion 10 is able to intermittently arrange the reinforcing fiber bundle 1M on the table 101. On the other hand, the supply mechanism 1S located in the upstream part of the accumulation portion 10 is able to draw the reinforcing fiber bundle 1M wound on the bobbin at a constant speed. Then, it is possible to reduce the influence of the inertia of the mechanism for changing the position of the movable roller 12.

B5. Other Example 5

In the example described above, the second control portion C2 controls the pressure of the space within the cylinder 13 according to the output of the tension detection portion St as shown in a lower right part of FIG. 1. However, the accumulation portion may have a form in which such control is not performed. Even in such a form, it is possible to reduce the influence of the inertia of the mechanism for changing the position of the movable roller 12.

B6. Other Examples 6

(1) In the example described above, the accumulation portion 10 comprises the two sensors Ss1 and Ss2 as the stored amount detection portion 19, and thus it is possible to detect the upper limit E2 and the lower limit E1 of the slide position of the movable roller 12 as shown in the left part of FIG. 1. However, as the stored amount detection portion, for example, a sensor such as a linear encoder that is able to quantitatively detect the position of the movable roller 12 may be used.

(2) In the example described above, the accumulation portion 10 comprises the stored amount detection portion 19 that detects the stored amount of reinforcing fiber bundle 1M based on the position of the movable roller 12 as shown in the left part of FIG. 1. However, the accumulation portion may have a form in which the stored amount detection portion is not comprised.

B7. Other Example 7

In the example described above, the supply mechanism 1S adjusts the supply speed of the reinforcing fiber bundle 1M according to the stored amount of reinforcing fiber bundle 1M detected with the stored amount detection portion 19 as shown in the upper left part of FIG. 1. However, the supply mechanism 1S may have a form in which such control is not performed. Even in such a form, the placement mechanism 1P located on the downstream side of the accumulation portion 10 is able to intermittently arrange the reinforcing fiber bundle 1M on the table 101 within a constant range. On the other hand, the supply mechanism 1S located on the upstream of the accumulation portion 10 is able to draw the reinforcing fiber bundle 1M wound on the bobbin within a constant range at a constant speed.

B8. Other Example 8

In the example described above, the accumulation portion 10 comprises the suction blower 17 that is connected to the space within the cylinder 13 and that discharges air in the space within the cylinder 13 to the outside and the valve 18 that controls the flow rate of gas in the flow path connecting the space within the cylinder 13 and the outside as shown in the lower right part of FIG. 1. However, the accumulation portion may have a form in which at least one of the blower and the valve is not comprised. In such a form, the accumulation portion is preferably configured to be able to supply the fluid into the space within the cylinder and discharge the fluid from the space within the cylinder.

This disclosure is not limited to the examples described above, and is able to be realized with various configurations without departing from the spirit thereof. For example, the technical features of the examples corresponding to the technical features described in Summary are able to be replaced or combined as necessary so that part or the whole of the problems described above are solved or part or the whole of the effects described above are achieved. When the technical features are not described in this specification to be essential, they may be deleted as necessary.

CROSS-REFERENCE TO RELATED APPLICATIONS

This application is based on and claims the benefit of priority to Japanese Patent Application No. 2019-066795 filed on Mar. 29, 2019, the entire contents of which are incorporated herein by reference.

What is claimed is:

1. A fiber placement device comprising:
   a table;
   a placement mechanism having a reinforcing fiber bundle supplied to be able to place the reinforcing fiber bundle in an arbitrary area on the table;
   a cutting blade that cuts the reinforcing fiber bundle supplied from the placement mechanism toward the table; and
   an accumulation portion arranged on a path of the reinforcing fiber bundle delivered toward the placement mechanism,
   wherein the accumulation portion comprises:
      a movable roller guiding the reinforcing fiber bundle delivered from the supply mechanism toward the placement mechanism, the movable roller being movable;
      a cylinder;
      a piston arranged within the cylinder, wherein an outer surface of the piston and an inner surface of the cylinder have a gap therebetween in which air passes through;
      a coupling member that couples the movable roller and the piston; and a blower fluidly connected to the cylinder to discharge a fluid from a space on a side opposite to the coupling member with respect to the piston within the cylinder to adjust a force applied to the piston.

2. The fiber placement device according to claim 1, wherein a distance of the gap between an inner surface of the cylinder and an outer surface of the piston is 0.001 to 5 mm.

3. The fiber placement device according to claim 1, wherein at least part of the coupling member is a flexible linear member, and the cylinder, the piston and the coupling member are configured to be able to pull, in a movable range of the movable roller, the movable roller against a tension of the reinforcing fiber bundle guided by the movable roller.

4. The fiber placement device according to claim 3, wherein the blower operates at a constant rate according to a desired value of a tension of the flexible linear member.

5. The fiber placement device according to claim 1, wherein:

the blower is connected to the space within the cylinder to discharge air in the space within the cylinder outside the cylinder, and the fiber placement device further comprises a valve controlling a flow rate of the air in a flow path connecting the space within the cylinder to the outside.

6. The fiber placement device according to claim 1, further comprising:

a supply mechanism drawing a reinforcing fiber bundle wound on a bobbin to supply the reinforcing fiber bundle.

7. The fiber placement device according to claim 6, wherein the supply mechanism adjusts a supply speed of the reinforcing fiber bundle according to a stored amount of the reinforcing fiber bundle.

8. The fiber placement device according to claim 1, wherein the cylinder is configured such that air passes though the cylinder.

\* \* \* \* \*